United States Patent [19]

Akao

[11] Patent Number: 5,100,721

[45] Date of Patent: Mar. 31, 1992

[54] FLAT LAMINATED THERMOPLASTIC MULTILAYER FILM AND MANUFACTURING METHOD OF THE SAME

[75] Inventor: Mutsuo Akao, Kanagawa, Japan

[73] Assignee: Fuji Photo Film Co., Ltd., Minami-ashigara, Japan

[21] Appl. No.: 436,705

[22] Filed: Nov. 15, 1989

[30] Foreign Application Priority Data

Nov. 17, 1988 [JP] Japan .................. 63-288992

[51] Int. Cl.⁵ .................. B32B 27/04; B65D 85/00
[52] U.S. Cl. .................. 428/218; 428/408; 428/324; 428/331; 428/328; 428/220; 428/516; 428/518; 428/520; 428/35.2; 264/176.1
[58] Field of Search .......... 428/516, 520, 220, 218, 428/518

[56] References Cited

U.S. PATENT DOCUMENTS

| | | |
|---|---|---|
| 3,973,063 | 8/1976 | Clayton .................. 428/167 |
| 4,147,291 | 4/1979 | Akao et al. . |
| 4,258,848 | 3/1981 | Akao et al. . |
| 4,303,710 | 12/1981 | Bullard et al. .................. 428/517 |
| 4,331,725 | 5/1982 | Akao . |
| 4,337,285 | 6/1982 | Akao et al. . |
| 4,356,224 | 10/1982 | Akao et al. . |
| 4,359,499 | 11/1982 | Akao et al. . |
| 4,386,124 | 5/1983 | Akao . |
| 4,411,943 | 10/1983 | Akao . |
| 4,411,945 | 10/1983 | Akao et al. . |
| 4,436,809 | 3/1984 | Akao et al. . |
| 4,452,846 | 6/1984 | Akao . |
| 4,469,741 | 9/1984 | Akao . |
| 4,513,050 | 4/1985 | Akao . |
| 4,547,427 | 10/1985 | Engelsberger . |
| 4,565,733 | 1/1986 | Akao . |
| 4,565,743 | 1/1986 | Akao . |
| 4,576,865 | 3/1986 | Akao . |
| 4,579,781 | 4/1986 | Akao . |
| 4,584,234 | 4/1986 | Hirose et al. . |
| 4,587,175 | 5/1986 | Akao . |
| 4,629,640 | 12/1986 | Akao . |
| 4,639,386 | 1/1987 | Akao . |
| 4,653,640 | 3/1987 | Akao . |
| 4,661,395 | 4/1987 | Akao . |
| 4,661,401 | 4/1987 | Akao . |
| 4,663,218 | 5/1987 | Akao . |
| 4,687,692 | 8/1987 | Akao . |
| 4,708,896 | 11/1987 | Akao . |
| 4,730,778 | 3/1988 | Akao et al. . |
| 4,778,712 | 10/1988 | Akao . |
| 4,778,713 | 10/1988 | Akao . |
| 4,784,906 | 11/1988 | Akao . |
| 4,787,506 | 11/1988 | Akao . |
| 4,796,823 | 1/1989 | Akao et al. . |
| 4,844,961 | 7/1989 | Aako . |
| 4,871,613 | 10/1989 | Akao . |
| 4,876,125 | 10/1989 | Akao . |
| 4,876,129 | 10/1989 | Akao . |
| 4,894,264 | 1/1990 | Akao . |
| 4,903,834 | 2/1990 | Akao . |
| 4,906,517 | 3/1990 | Akao . |
| 4,925,711 | 5/1990 | Akao . |

FOREIGN PATENT DOCUMENTS

| | | |
|---|---|---|
| 1163067 | 3/1984 | Canada . |
| 93423 | 11/1983 | European Pat. Off. . |
| 282875 | 9/1988 | European Pat. Off. . |
| 299520 | 1/1989 | European Pat. Off. . |

Primary Examiner—P. C. Sluby
Attorney, Agent, or Firm—Burns, Doane, Swecker & Mathis

[57] ABSTRACT

A laminated film which comprises a pair of coextruded multilayer inflation film layers disposed symmetrically and joined by blocking, wherein the inner layers are joined by blocking are composed of a resin having a Vicat softening point of lower than 120° C., and a method of manufacturing the above film which comprises extruding a coextruded multilayer inflation film from an extruder at a temperature of the molten resin forming the inner layer being higher than the Vicat softening point of the resin by more than 50° C., and joining the inner layer of the inflation film by blocking. A laminated film laminated by blocking can stably be produced, and the laminated film is excellent in physical strength and bag rupture strength.

6 Claims, 2 Drawing Sheets

FLAT LAMINATED THERMOPLASTIC MULTILAYER FILM AND MANUFACTURING METHOD OF THE SAME

BACKGROUND OF THE INVENTION

1. Field of the Invention

This invention relates to a blocking laminated film obtained through an inflation film molding process using a thermoplastic resin and a manufacturing method for the same.

2. Description of the Prior Art

In general, packaging materials for high technology products such as photographic photosensitive materials are required to have various properties including gas barrier, moistureproofness, physical strength such as breaking strength, tear strength, impact puncture strength, Gelbo test strength and wear resistance, heat sealing properties such as heat seal strength, hot tack properties (hot-seal ability) and seal ability with other materials, antistatic property, flatness, and the like. It is difficult to satisfy these properties with a single film material, and therefore, the packaging material is usually composed of two or more layers.

In order to improve the physical strength of packaging materials, the inventor developed a cross laminated film comprising two uniaxially stretched thermoplastic resin films laminated directly or through an adhesive layer so that their molecular orientation axes cross each other (U.S. Pat. No. 4,331,725). Another cross laminated film which has been developed contains a foamed sheet interposed between the above uniaxially stretched films (U.S. Pat. No. 4,565,733). In addition, the inventor has investigated in order to further improve the quality and cost of packaging materials, and has developed a packaging material of a multilayer laminated film excellent in physical strength and inexpensive where the inner layer of a coextruded multilayer inflation film is joined utilizing a blocking phenomenon (which is considered to be a serious problem in a inflation process) by using a special resin composition as the inner layer of the inflation film (U.S. Ser. No. 07/218,908).

However, in the conventional multilayer laminated film where a coextruded T die film or inflation film was laminated through an adhesive layer, there are many problems, such as great trimming loss, low flexibility, low bag rupture strength, low tear strength, great curling and the like. The cross laminated films are excellent in bag rupture strength. However, it has also various problems, such as being expensive and having inferior heat sealing properties. Moreover, when respective layers are completely adhered by adhesive layer, tear strength and the like decrease, and curling greatly occurs.

On the other hand, in the case of the laminated film made of an inflation film of which the inner layer is joined by blocking, no adhesive layer nor lamination process is necessary. Moreover, since the above laminated film can be made without cutting both sides different from conventional inflation films, edge trim loss is not produced. The laminated film cost per unit area is sharply decreased, and nevertheless, physical strength is greatly improved. However, when a flexible sheet is laminated to this blocking laminated film, unless the area joining the inner layers of the inflation film to each other by blocking is rendered more than 95%, wrinkling and the separation at the blocking portion frequently occur in the lamination process caused by the air remaining in the unjoined portion. The adhesive strength obtained by the blocking is liable to vary by the cooling conditions and the room temperature and humidity during molding by the inflation process, and the resin composition of the inner layer must be limited strictly. Moreover, in the case that the resin composition of the outer layer is similar to the inner layer, blocking occurs not only between the inner layers but also between the outer layers facing to each other when the inflation film is wound after cooling. Such a laminated film cannot be used. While, when the outer layer is controlled so that blocking does not occur, it is difficult to join the inner layers by blocking.

SUMMARY OF THE INVENTION

An object of the invention is to provide a laminated film excellent in physical strength and bag rupture strength of which the inner layers are joined by blocking while blocking does not occur between the outer layers.

Another object of the invention is to provide a laminated film excellent in the smoothness and having few occurrences of pinholes in the inner layers joined to each other by blocking.

Another object of the invention is to provide a manufacturing method for the laminated film which has achieved the foregoing objects.

The present invention provides a laminated film achieving the above objects which comprises a pair of coextruded multilayer inflation film layers disposed symmetrically and joined by blocking, wherein the layers joined by the blocking are composed of a resin having a Vicat softening point of lower than 120° C.

The present invention also provides a method of manufacturing the above film which comprises extruding a coextruded multilayer inflation film from an extruder at a temperature of the molten resin forming the inner layer being higher than the Vicat softening point of the resin by more than 50° C., and joining the inner layer of the inflation film by blocking.

DETAILED DESCRIPTION OF THE INVENTION

Figure 1:
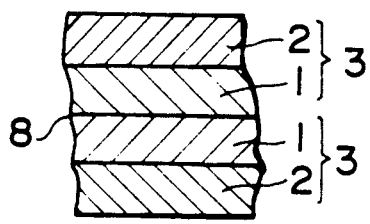
FIGS. 1 through 3 are partial sectional views of preferred embodiments of the invention.

The Vicat softening point (testing method for Vicat softening temperature of thermoplastics ASTM D-1525) of the resin forming the inner layer is lower than 120° C., preferably lower than 110° C., and the resin is extruded from an extruder at a temperature higher than the above Vicat softening point by more than 50° C. When the temperature of the molten resin does not reach the temperature higher than the above Vicat softening point by 50° C., the area joined by blocking is insufficient. As a result, wrinkling and the separation of the blocking portion frequently occur by the air remaining in the unjoined portions during the lamination process. A preferred temperature of the molten resin forming the inner layer is higher than the Vicat softening point of the above resin by 50° to 150° C., particularly by 70° to 120° C.

The lamination may be strengthened by pressing the inflation film using a pressure type embossing roll having a shape of silk cloth mark, grid, parallel streaks in longitudinal, lateral or diagonal direction or by using a flat or embossing heating roll. The embossing roll or heating roll may be provided before or after the squeeze roll (nip roll) of the inflation film molding machine, or the pressing may be carried out separately after the inflation film molding process. Additionally, before entering the squeeze roll, the film surface may be heated by an infrared lamp or by hot air.

The resin usable for the inner layer includes high pressure branched low density polyethylene (LDPE) resin, linear low density polyethylene (ethylene-α-olefin copolymer resin, L-LDPE) resin, low, medium pressure medium density polyethylene resin, extremely low density L-LDPE resin, propylene ethylene random copolymer resin, propylene-ethylene block copolymer resin, poly(butene-1) resin, poly(4-methylpentene-1) resin, polyisobutylene resin, ethylene-vinyl acetate copolymer resin, ethylene-ethyl acrylate copolymer resin, ethylene-ethyl methacrylate copolymer resin, ethylene-acrylic acid copolymer resin, ionomer resin, modified ethylene copolymer resins, modified polypropylene resins, elastomer resins, tackifier resin and polyvinylidene chloride resin. These resins may be used as a single resin or blends.

A preferable resin for the inner layer is a L-LDPE resin having a density of less than 0.925 g/cm$^3$. In the case of a L-LDPE resin having a density of more than 0.925 g/cm$^3$, the adhesive force by blocking is weak, even though the molding temperature is elevated, and layer separation is liable to occur. When another resin is blended, a suitable content of the preferred L-LDPE resin is more than 20 wt. %, particularly more than 50 wt. %. Another preferable resin is ethylene acrylate ester copolymer resin and/or tackifier resins. A particularly preferred resin is a blend resin containing more than 50 wt. % of ethylene-acrylate ester copolymer resin of which the content of methyl acrylate unit and/or methyl methacrylate unit and/or ethyl acrylate unit is more than 7 wt. % and more than 10 wt. % of ethylene copolymer resin. Another preferable resin is ethylene-vinyl acetate copolymer resin, and in this case, it is preferred that it contain more than 10 wt. % of an ethylene-vinyl acetate copolymer resin of which the content of vinyl acetate unit is more than 5 wt. %. While, to use or to blend high density polyethylene resin is not preferable in order to generate blocking sufficiently.

The resin usable for layers other than the inner layer include the aforementioned resins, and other known resins such as low, medium pressure high density polyethylene resin, various polyester resins such as polyethylene terephthalate resin and polyethylene isophthalate resin, various polyamide resins such as nylon 6 resin, nylon 66 resin, nylon 11 resin and nylon 12 resin, polystyrene resin, chlorinated polyethylene resin, polyacrylonitrile resin, polyvinylidene chloride resin, polyvinyl chloride resin, polycarbonate resin, modified resins thereof, and blended resins thereof. The extruding resin temperature of the other layers than the inner layer is set according to respective resin composition and the like. Particularly, the temperature of the outer layer is necessary to be controlled so that blocking does not occur between them when it is wound by the winder. For that purpose, it can take a suitable measure, such as the extruding resin temperature of the outer layer is rendered lower, or the molded outer layer is cooled before it is wound.

The simplest structure of the laminated film is a four layer construction, and it may be composed of 6 layers, 8 layers or more plural layers by incorporating intermediate layers. One or more flexible sheet layers may be laminated by using adhesive layers.

The laminated film may contain light-shielding material, lubricant, antioxidant, antiblocking agent and other additives in each layer. However, to add antiblocking agent or lubricant to the inner layer is not preferred in view of the sufficient occurrence of blocking.

Light-shielding material usable in the invention includes various carbon blacks, graphite, iron oxide, zinc white, titanium nitride, titanium oxide, clay, metal powder such as aluminum powder, tin powder, zinc powder and lead powder, aluminum paste, calcium carbonate, mica, kaolin, silica, sericite, pyrophyllite, barium sulfate, talc, cadmium pigments, red iron oxide, cobalt blue, copperphthalocyanine pigments, monoazo and polyazo pigments and aniline black. In view of quality, cost, light-shielding ability and the like, preferable light-shielding materials are light-absorptive or light-reflective pigments, particularly, black pigments of various carbon blacks, titanium nitride and graphite and light reflective light shielding materials of aluminum powder and aluminum paste from which volatile components are removed.

Carbon blacks are divided into gas black, oil furnace black, channel black, anthracene black, acetylene black, lamp black, pine black, vegetable black, animal black and the like. Among them, oil furnace carbon black is preferred in terms of light-shielding ability, cost and improvement of physical strength. On the other hand, since acetylene carbon black, Ketschen carbon black and graphite have antistatic character, they are also preferred, though they are expensive. Preferable carbon blacks are those having a pH of 5 to 9, particularly 6 to 8 and a mean particle size of 10 to 120 mμ, and acetylene carbon black and oil furnace carbon black having a pH of 6 to 9 and a mean particle size of 15 to 50 mμ are particularly preferred. By using the carbon black of such pH and particle size, a packaging material having the following merits is obtained. That is, the occurrence of fogging is rare, increase or decrease of photosensitivity scarcely happens, light shielding ability is great, and the lumps of carbon black and pinholes such as fish eyes rarely occur. A suitable content of carbon black is 0.05 to 15 wt. %. When the content is less than 0.05 wt. %, it is necessary to incorporate another light-shielding layer. While, when the content is beyond 15 wt. %, physical strength and heat sealing properties decrease.

The form of the light shielding material prior to blending may be powder, paste, liquid, dye color granules, masterbatch pellets, etc. As the method of blending the light-shielding material, there are the masterbatch method, dye color granule method, the compound coloring method and the like. Among them, dye color granules and masterbatch pellets are preferred in view of not contaminating the working place and cost.

A lubricant improves resin fluidity, product insertion ability, handling, antistatic property, antiblocking property, film moldability and processibility. Representative lubricants are silicone lubricants, oleic acid amide lubricants, erucic acid amide lubricants, stearic acid amide lubricants, bis fatty acid amide lubricants and alkylamine lubricants, as well as paraffin wax. In the case of dimethylpolysiloxane, the viscosity is preferably 1,000 to 100,000 cps at 25° C. When the viscosity is less than 1,000 cps, the dimethylpolysiloxane adversely affects photographic photosensitive materials such as by causing fogging and variations of photosensitivity. While, when the viscosity is beyond 100,000 cpm, handling is inferior, and moreover it is expensive. A suitable content of the lubricant is 0.01 to 5 wt. %. When the content is less than 0.01 wt. %, the aforementioned improvements are insufficient. While, when the content is beyond 5 wt. %, screw slip in the extruder increases, and it is difficult to form films having an uniform thickness. Moreover, bleeding out is liable to occur, and in the case of using the laminated film for photographic photosensitive materials, development troubles occur by the adhesion of the lubricant to the photosensitive layer.

Antioxidant usable in the invention are phenol antioxidants, sulfur-containing antioxidants, phosphorus-containing antioxidants and the like. The phenol antioxidants include n-octadecyl-3-(3',5'-di-t-butyl-4'-hydroxyphenyl)propionate, 2,6-di-t-butyl-4-methylphenol, 2,6-di-t-butyl-p-cresol (BHT), 2,2'-methylenebis(4-methyl-6-t-butylphenol), 4,4'-thiobis(3-methyl-6-t-butylphenol), 4,4'-butylidenebis(3-methyl-6-t-butylphenol), stearyl-$\beta$(3,5-di-4-butyl-4-hydroxyphenyl)propionate, 1,1,3-tris(2-methyl-4-hydroxy-5-t-butylphenyl)butane, 1,3,5-trimethyl-2,4,6-tris(3,5-di-t-butyl-4-hydroxybenzyl) benzene and tetrakis methylene-3(3',5=-di-t-butyl-4'-hydroxyphenyl)propionate methane. The sulfur-containing oxidation inhibitors include dilauryl-3,3'-thiodipropionate, dimyristyl-3,3'-thiodipropionate, laurylstearylthiodipropionate, distearyl-3,3'-thiodipropionate and ditridecyl-3,3'-thiodipropionate. The phosphorus-containing antioxidants include trinonylphenylphosphite and triphenylphosphite. Particularly effective antioxidants are BHT, low volatile high molecular weight phenol antioxidants ("Irganox 1010", "Irganox 1076", trade names of Ciba-Geigy A.G., "Topanol CA", trade name of I.C.I., etc.), dilaurylthiodipropionate, distearylthiodipropionate, dialkylphosphate, etc. Two or more antioxidants may be combined. A suitable content of antioxidant is 0.01 to 2 wt. %. When the content is less than 0.01 wt. %, oxidation inhibition is insufficient, and the generation of lumps of antioxidant increases due to the oxidation of resin. The lumps degrade the appearance of the film, and cause pressure mark on the photographic photosensitive materials packaged therein. While, when the content is beyond 2 wt. %, the antioxidant adversely affects photographic photosensitive materials utilizing oxidation-reduction reaction, gradually bleeds out to reduce heat seal strength and degrades appearance.

Suitable antiblocking agents are silica, calcium silicate, aluminum silicate, talc (magnesium silicate), calcium carbonate, higher fatty acid polyvinyl esters, n-octadecyl urea, dicarboxylic acid ester amides, N,N'-dioleylhydroxyamide, N-ethanolstearic amide and the like.

Various additives may be added to each layer of the laminated film of the invention. Examples of the additives are described below.

(1) Plasticizer phthalic acid esters, glycol esters, fatty acid esters, phosphoric acid esters, etc.

(2) Stabilizer lead compounds, cadmium compounds, zinc compounds, alkaline earth metal compounds, organic tin compounds, etc.

(3) Antistatic agent cationic surfactants, anionic surfactants, nonionic surfactants, ampholytic surfactants, various carbon blacks, metal powder, graphite, etc.

(4) Flame retardant phosphoric acid esters, phosphoric acid ester halides, halides, inorganic materials, polyols containing phosphorous, etc.

(5) Filler alumina, kaolin, clay, calcium carbonate, mica, talc, titanium dioxide, silica, etc.

(6) Reinforcing agent glass lobing, metallic fiber, glass fiber, glass milled fiber, carbon fiber, etc.

(7) Blowing agent inorganic blowing agents (ammonium carbonate, sodium hydrogen carbonate), organic blowing agents (nitroso compounds, azo compounds), etc.

(8) Vulcanizing agent vulcanization accelerator, acceleration assistant, etc.

(9) Deterioration preventing agent ultraviolet absorber, antioxidant, metal deactivator, peroxide decomposing agent, etc.

(10) Coupling agent silane compounds, titanium compounds, chromium compounds, aluminum compounds, etc.

The thickness of the inflation film layer is usually 15 to 200 μm, particularly 20 to 100 μm.

The inflation film layers are molded by the inflation process, and the inside of the molded tubular film is joined through a pseudo-adhesive portion formed by blocking. That is, the inflation film layers are symmetrically joined without using an adhesive. In the packaging material of the invention, it is sufficient that the inner layers of the inflation film layers are joined by the pseudo-adhesion formed by blocking, and the blocking area is preferably more than 95%, in view of the prevention of wrinkling, thickening, laminating ability, bag-making ability and the like. They are joined in a flexible state, and the adhesive strength may be in the range from the lightly joined state to the maximum heat strength in the case that the inflation films are joined by heat seal at a suitable temperature. Preferable adhesive strength is 0.01 to 1000 g/15 mm width, and particularly preferable adhesive strength is 0.1 to 300 g/15 mm width, when it is measured according to the testing method of delamination resistance described in U.S. Pat. No. 4,708,896. When the blocking is too weak, the inflation films separate during various processes, and wrinkling, thickening, slippage or the like occurs. While, the blocking strength is too great, the laminated film formed by blocking becomes like a single layer film, physical strength is lowered. The laminated film becomes stiff, and bursting strength decreases.

The blocking is made to occur by passing the film through squeeze (nip) roll or a pressure roll newly incorporated before and/or after the nip roll or the like.

Various flexible sheets may be laminated to the laminated film of the invention directly or through an adhesive layer.

The laminated film of the invention may be used for shopping bag, bags for heavy materials such as cement, resin, rice, wheat and feed, packaging bags for various products such as machines, tent and hood, and it is suitable for photosensitive materials such as photographic photosensitive materials, food, medicines and chemical substances. Particularly, it is suitable for packaging silver halide photographic photosensitive materials, diazo photographic photosensitive materials, thermosensitive photographic photosensitive materials, photofixing-type thermosensitive photosensitive materials, photosensitive resin photographic photosensitive materials, ultraviolet curing-type photosensitive materials, transfer-type heat developing photosensitive materials, direct positive type photographic photosensitive materials, self-developing type photographic photosensitive materials, diffusion transfer type photographic photosensitive materials, and other photographic materials which are degraded by small amounts of moisture, light or gas.

When the laminated film of the invention is used for the above photographic photosensitive materials, the package form may be conventional, and includes a single-sheet flat bag, a double sheet flat bag, a self-standing bag, a single-sheet gusset bag, a double-sheet gusset bag, inner lining for a moisture proof box, inner lining for a light room-loading light-shielding box and a leader paper. The sealing form may also be conventional, and includes heat sealing, side welding, impulse heat sealing, supersonic sealing and high frequency sealing. The methods using an adhesive may also be utilized.

In the laminated film of the invention, the inner layer is rendered in the state irrespective of the resin composition that blocking readily occur by employing a resin having a Vicat softening point of lower than 120° C. for the inner layer and by extruding the resin to form the inner layer at a resin temperature higher than the Vicat softening point by 50° C. or more. Lump generation is reduced in the inner layer, and the smoothness of the inner layer is improved. Moreover, pinholes do not occur in the inner layer.

EXAMPLES

The laminated film of FIG. 1 is composed of a pair of coextruded double layer films 3 consisting of an inner layer 1 and an outer layer 2 wherein both inner layers 1,1 are joined by pseudo adhesion formed by blocking at the portion 8.

Figure 2:
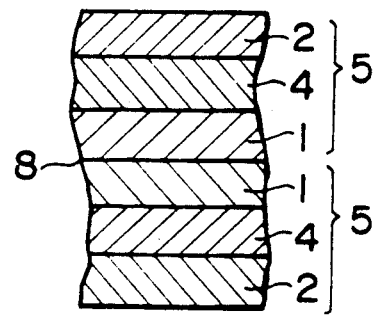

The laminated film of FIG. 2 is the same as the laminated film of FIG. 1, except that the coextruded film is a triple layer film 5 containing an intermediate layer 4.

Figure 3:
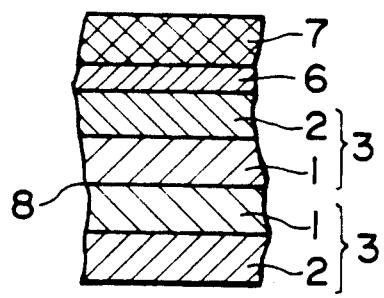

The laminated film of FIG. 3 is composed of the laminated film of FIG. 1 and a flexible sheet 7 laminated thereon through an adhesive layer 6.

Figure 5:
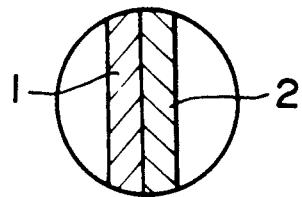
FIG. 5 is an enlarged partial sectional view at the part A in FIG. 4.
Figure 6:
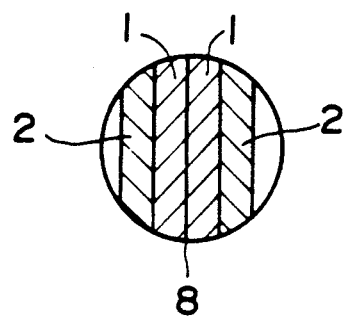
FIG. 6 is an enlarged partial sectional view at the part B in FIG. 4.
Figure 4:
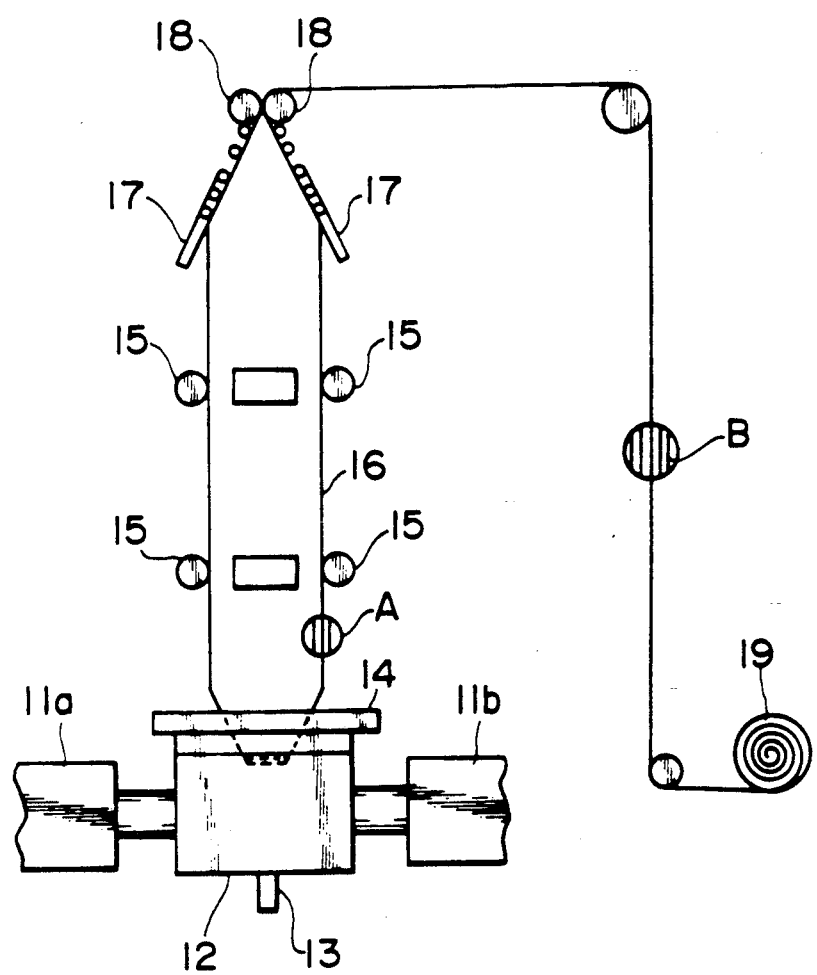
FIG. 4 is a schematic illustration of an apparatus used for the invention.

The laminated film of FIG. 1 is formed by using the inflation film molding machine shown in FIG. 4. The inflation film molding machine is composed of extruders 11a, 11b heating and kneading the resin, ring die 12 extruding the molten resin from the slit (not indicated) into a tube-shape, blast tube 13 blowing compressed air, air ring 14 cooling the molten resin extruded in tube-shaped, guide rollers 15 guiding the tube-shaped resin film 16, guide plates 17 guiding the tube-shaped resin film 16 into a flat shape, a pair of squeeze rolls 18 (nip roll) nipping to attract the tube-shaped resin film 16, and winder 19 winding the film. When the coextruded multilayer inflation film of FIG. 1 composed of the inner layer 1 of an L-LDPE resin film layer and the outer layer 2 of an HDPE resin film layer is molded by using the inflation film molding machine, L-LDPE resin and HDPE resin having prescribed compositions respectively are melted and kneaded separately by the extruders. At that time, the L-LDPE is melted at a temperature higher than the Vicat softening point by more than 50° C. They are extruded from the circular slit of the ring die 12 so that the L-LDPE resin film layer is disposed on the inside, i.e. the HDPE resin film layer is disposed on the outside, as shown in FIG. 5. The extruded film is inflated by the compressed air blown from the blast tube 13, and cooled by the cooling air blown from the air ring 14 up to the degree not to adhere the outer layer 2 to the squeeze roll 18. While, since the inner layer 1 is extruded at a high temperature, it travels in an adhesive state. The tube-shaped resin film 16 having a prescribed diameter thus formed ascends with the guide of the guide rollers 15, ..., 15, and is led into a flat shape by the guide plates 17. The film is pressed by passing the squeeze roll 18, and the inner layer 1 are joined by blocking as shown in FIG. 6. Then, the film 16 is wound with the winder 19.

A product of the invention I and a comparative product I were prepared according to the above process.

Product of the Invention I

The product of the invention I has a layer construction shown in FIG. 1. The inner layer 1 is 20 μm thick and is composed of 92.45 wt. % of L-LDPE resin being a copolymer resin of ethylene and 4-methylpentene-1 having a density of 0.920 g cm$^3$, a MI of 2.1 g/10 minutes and a Vicat softening point of 100° C., 0.05 wt. % of synthetic silica and 7.5 wt. % of LDPE resin masterbatch containing 40 wt. % of oil furnace carbon black. The thickness and the resin composition of the outer layer 2 are the same as the inner layer 1. The extruded resin temperature of the inner layer 1 was 190° C., and that of the outer layer 2 was 155° C.

The inner layers 1,1 of the laminated film were completely joined by blocking. Whereas, the outer layers 2,2 were not joined by blocking in the wound state, and the laminated film were readily unwound. The inner layers 1,1 of the unwound film were still joined to each other by blocking, and when both edges were slit, they were not separated. When a flexible sheet was laminated to the above laminated film through an adhesive layer, wrinkling did not occur. The laminated film formed by blocking was excellent in heat sealing properties such as heat seal strength and elapsed heat seal strength and had a great physical strength.

Comparative Product I

The comparative product I has a layer construction shown in FIG. 1. The thickness and the resin composition of the inner layer and the outer layer are the same as the product of the invention I. The extruded resin temperature of both layers was the same 145° C. The outer molding conditions were the same as the product of the invention 1.

Only slightly blocking occured between the inner layers 1,1, of the produced film, and when both edges were slit before winding, they were separated. When the same flexible sheet was laminated to the produced film without slitting both edges, wrinkling occurred. While, when both edges of the produced film once wound was slit after unwinding, the inner layers 1,1 were still separated.

I claim:

1. A flat laminated thermoplastic film which comprises a pair of coextruded multilayer inflation film layers each having an inner layer, said pair of film layers being disposed symmetrically and joined by blocking wherein the inner layers are joined by blocking with a blocking area of more than 95% and wherein the adhesive strength between the inner layers is 0.1 to 300 g/15 mm width, said inner layers being composed of a resin having a Vicat softening point of lower than 120° C.

2. The laminated film of claim 1 wherein said resin contains more than 50 wt. % of L-LDPE resin having a density of less than 0.925 g/cm$^3$ and has a Vicat softening point of lower than 110° C.

3. The laminated film of claim 1 wherein said resin contains more than 50 wt. % of ethylene-acrylate ester resin containing more than 7 wt. % of methyl acrylate and/or methyl methacrylate and/or ethyl acrylate unit content and more than 10 wt. % of an ethylene copolymer resin.

4. The laminated film of claim 1 wherein said resin contains more than 10 wt. % of ethylene vinyl acetate copolymer resin containing more than 5 wt. % of vinyl acetate unit content.

5. The laminated film of claim 1 wherein the resin composing the inner layer is at least one resin selected from high pressure branched low density polyethylene resin, linear low density polyethylene resin, low pressure medium density polyethylene resin, medium pressure medium density polyethylene resin, extremely low density linear low density polyethylene resin, propylene-ethylene random copolymer resin, propylene-ethylene block copolymer resin, poly(butene-1) resin, poly(4-methylpentene-1) resin, polyisobutylene resin, ethylene-vinyl acetate copolymer resin, ethylene-ethyl acrylate copolymer resin, ethylene-ethyl methacrylate copolymer resin, ethylene-acrylic acid copolymer resin, ionomer resin, modified ethylene copolymer resins, modified polypropylene resins, elastomer resins, tackifier resin and polyvinylidene chloride resin.

6. The laminated film of claim 1 wherein said Vicat softening point is lower than 110° C.

* * * * *